United States Patent
Ma

(10) Patent No.: US 11,994,766 B2
(45) Date of Patent: May 28, 2024

(54) BACKLIGHT MODULE, METHOD OF MANUFACTURING THE SAME, DISPLAY DEVICE

(71) Applicant: BOE Technology Group Co., Ltd., Beijing (CN)

(72) Inventor: Ruoyu Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/764,427

(22) PCT Filed: May 12, 2021

(86) PCT No.: PCT/CN2021/093315
§ 371 (c)(1),
(2) Date: Mar. 28, 2022

(87) PCT Pub. No.: WO2022/001388
PCT Pub. Date: Jan. 6, 2022

(65) Prior Publication Data
US 2023/0117666 A1   Apr. 20, 2023

(30) Foreign Application Priority Data
Jun. 30, 2020   (CN) .......................... 202010616283.8

(51) Int. Cl.
*G02F 1/1335*   (2006.01)
*G02B 3/00*   (2006.01)
(Continued)

(52) U.S. Cl.
CPC ..... *G02F 1/133603* (2013.01); *G02B 3/0006* (2013.01); *G02B 5/045* (2013.01); *G02F 1/133607* (2021.01)

(58) Field of Classification Search
CPC .................... G02F 1/133603; G02F 1/133607
See application file for complete search history.

(56) References Cited

U.S. PATENT DOCUMENTS 8,995,807 B1   3/2015 Jalava
9,436,015 B2 *   9/2016 Woodgate .............. G02B 30/33
(Continued)

FOREIGN PATENT DOCUMENTS

CN   105448197 A   3/2016
CN   109709675 A   5/2019
(Continued)

OTHER PUBLICATIONS

Office Action dated May 25, 2022, issued in counterpart CN application No. 202010616283.8, with English translation. (7 pages).

*Primary Examiner* — Charlie Y Peng
(74) *Attorney, Agent, or Firm* — WHDA, LLP

(57) ABSTRACT

A backlight module, including: a first base, a mini light-emitting diode chip array, an encapsulation layer covering the mini light-emitting diode chip array and a superlens array sequentially arranged on a first substrate; and a second base, a wire grate array and a prism structure sequentially arranged on a second substrate. The superlens array, the wire grate array and the prism structure include a plurality of superlenses, a plurality of wire grates and a plurality of prism groups, respectively. The second base is a glass base, orthographic projections of the plurality of wire grates on the first base at least partially overlap with the orthographic projections of the plurality of superlenses on the first base, respectively, and orthographic projections of the plurality of prism groups on the first base are located between the orthographic projections of two adjacent wire grates on the first base, respectively.

17 Claims, 11 Drawing Sheets

(51) Int. Cl.
*G02B 5/04* (2006.01)
*G02F 1/13357* (2006.01)

(56) References Cited

U.S. PATENT DOCUMENTS

| | | | |
|---|---|---|---|
| 10,928,674 B1 | 2/2021 | Chou et al. | |
| 11,281,048 B2 | 3/2022 | Song et al. | |
| 11,353,706 B2 | 6/2022 | Guo et al. | |
| 2012/0170072 A1* | 7/2012 | Miyazaki | G02B 13/26 |
| | | | 359/619 |
| 2014/0133020 A1* | 5/2014 | Woodgate | G02B 27/02 |
| | | | 359/462 |
| 2019/0157598 A1 | 5/2019 | Ahmed et al. | |
| 2020/0166783 A1 | 5/2020 | Roy et al. | |
| 2020/0203577 A1 | 6/2020 | Tamma et al. | |
| 2020/0203585 A1 | 6/2020 | Lopez-Julia et al. | |
| 2021/0333637 A1 | 10/2021 | Song et al. | |
| 2021/0364799 A1 | 11/2021 | Guo et al. | |

FOREIGN PATENT DOCUMENTS

| | | | | |
|---|---|---|---|---|
| CN | 110174802 A | | 8/2019 | |
| CN | 111025757 A | | 4/2020 | |
| CN | 111221178 A | | 6/2020 | |
| CN | 111624817 A | | 9/2020 | |
| KR | 20160149280 A | * | 12/2016 | ............. F21V 13/02 |
| WO | 2020/005384 A1 | | 1/2020 | |

\* cited by examiner

BACKLIGHT MODULE, METHOD OF MANUFACTURING THE SAME, DISPLAY DEVICE

CROSS REFERENCE TO RELATED APPLICATION(S)

This application is a Section 371 National Stage Application of International Application No. PCT/CN2021/093315, filed on May 12, 2021, entitled "BACKLIGHT MODULE AND MANUFACTURING METHOD THEREOF, AND DISPLAY DEVICE", which claims priority to Chinese Application No. 202010616283.8, filed on Jun. 30, 2020, incorporated herein by reference in their entirety.

TECHNICAL FIELD

The present disclosure relates a field of display technology, and in particular, to a backlight module, a method of manufacturing a backlight module, and a display device.

BACKGROUND

Light-Emitting Diode (LED) technology has been developed for nearly three decades, and its application range has been continuously expanded. For example, a LED may be used in a field of display, as a backlight of a display device or as an LED display screen. With the development of technology, Mini Light-Emitting Diode (Mini LED) has gradually become a research hotspot in a field of display technology. For example, a Mini LED may be used in a backlight module of a liquid crystal display device as a light-emitting element of the backlight module. In this way, by utilizing advantages of the Mini LED, the backlight module may achieve advantages of divisional dimming, fast response, simple structure, long life, etc.

Above information disclosed in this section is only for understanding the background of the inventive concept of the present disclosure. Therefore, the above information may contain information that does not constitute the prior art.

SUMMARY

In order to solve at least one aspect of the above-mentioned problems, the embodiments of the present disclosure provide a backlight module, a method of manufacturing a backlight module, and a display device.

In an aspect, a backlight module is provided, including: a first substrate, wherein the first substrate includes: a first base; a mini light-emitting diode chip array arranged on the first base, and the mini light-emitting diode chip array includes a plurality of mini light-emitting diode chips; an encapsulation layer arranged on the first base and covering the mini light-emitting diode chip array; and a superlens array arranged on a surface of the encapsulation layer away from the first base, and the superlens array includes a plurality of superlenses; and a second substrate stacked on the first substrate, wherein the second substrate includes: a second base, and the second substrate has a first surface close to the first substrate and a second surface away from the first substrate; a wire grate array arranged on the first surface, and the wire grate array includes a plurality of wire grates; and a prism structure arranged on the second surface, wherein the prism structure includes a plurality of prism groups, wherein the second base is a glass base, orthographic projections of the plurality of superlenses on the first base at least partially overlap with orthographic projections of the plurality of mini light-emitting diode chips on the first base, respectively, orthographic projections of the plurality of wire grates on the first base at least partially overlap with the orthographic projections of the plurality of superlenses on the first base, respectively, and orthographic projections of the plurality of prism groups on the first base are located between the orthographic projections of two adjacent wire grates on the first base, respectively.

According to some exemplary embodiments, the backlight module further includes a third substrate stacked on a surface of the second substrate away from the first substrate, wherein the third substrate includes: a third base, and the third base includes a first surface close to the second substrate and a second surface away from the second substrate; and a brightness enhancement structure arranged on one of the first surface of the third substrate and the second surface of the third substrate, wherein the third base is a glass base, an orthographic projection of the brightness enhancement structure on the second substrate at least partially overlaps with the orthographic projection of the prism structure on the second substrate.

According to some exemplary embodiments, the third substrate further includes: a plurality of holes arranged in the third base; and a quantum dot material filled in the plurality of holes.

According to some exemplary embodiments, the plurality of mini light-emitting diode chips are arranged as an array in a first direction and a second direction on the first base, the first direction and the second direction are perpendicular to each other, and a third direction is perpendicular to a plane in which the first direction and the second direction are located; and wherein each superlens includes a plurality of columnar microstructures, and the plurality of columnar microstructures are arranged as an array in the first direction and the second direction on a surface of the encapsulation layer away from the first base.

According to some exemplary embodiments, a wavelength of light emitted by the mini light-emitting diode chip is $\lambda$, and sizes of each columnar microstructure in the first direction, the second direction and the third direction are all in a range of $0.01\lambda$ to $100\lambda$.

According to some exemplary embodiments, in each superlens, spacing distances between two adjacent columnar microstructures in both the first direction and the second direction are in a range of $0.01\lambda$ to $100\lambda$.

According to some exemplary embodiments, the wire grate is a diffraction wire grate.

According to some exemplary embodiments, each prism group includes a plurality of prisms, each prism extends in the second direction, and the plurality of prisms included in one same prism group are arranged in the first direction.

According to some exemplary embodiments, each prism is a triangular prism, each prism has an apex angle, and the apex angle is located on a side of the prism away from the second surface; and wherein in one same prism group, apex angles of at least some of the plurality of prisms are different from each other.

According to some exemplary embodiments, each prism group has a symmetry plane, the symmetry plane is perpendicular to the second surface and extends in the second direction, and each prism group has a plane-symmetric structure that is symmetric with respect to the symmetry plane; and wherein a spacing distance in the first direction between an orthographic projection of the symmetry plane on the first surface and one of two adjacent wire grates, is equal to a spacing distance in the first direction between the orthographic projection of the symmetry plane on the first surface and the other of the two adjacent wire grates.

According to some exemplary embodiments, in one same prism group, the apex angles of the plurality of prisms on one side of the symmetry plane gradually decrease in a direction from a prism farthest from the symmetry plane to the symmetry plane.

According to some exemplary embodiments, the apex angles of the plurality of prisms on the one side of the symmetry plane gradually decrease with a fixed difference.

According to some exemplary embodiments, the apex angles of the plurality of prisms in each prism group are in a range of 40° to 80°.

According to some exemplary embodiments, the brightness enhancement structure includes a first prism group and a second prism group, the first prism group is arranged on one of the first surface of the third substrate and the second surface of the third base, and the second prism group is arranged on a side of the first prism group away from the third base; and wherein the first prism group includes a plurality of first prisms, the second prism group includes a plurality of second prisms, each first prism extends in the second direction, each second prism extends in the first direction, the plurality of first prisms in the first prism group are arranged in the first direction, and the plurality of second prisms in the second prism group are arranged in the second direction.

According to some exemplary embodiments, the third substrate further includes a planarization layer between a layer where the first prism group is located and a layer where the second prism group is located, a material of the planarization layer includes an optical glue, and a refractive index of the optical glue is smaller than a refractive index of a material of each of the first prisms and the second prisms.

In another aspect, a display device is provided, wherein the display device includes the backlight module described above.

In yet another aspect, a method of manufacturing a backlight module is provided, including:

forming a mini light-emitting diode chip array and an encapsulation layer covering the mini light-emitting diode chip array on a first base, wherein the mini light-emitting diode chip array includes a plurality of mini light-emitting diode chips;

forming, by a nano-imprinting process, a superlens array on a surface of the encapsulation layer away from the first base, wherein the superlens array includes a plurality of superlenses;

forming a wire grate array on a first surface of a glass base, wherein the wire grate array includes a plurality of wire grates;

forming a prism structure on a second surface of the glass base, wherein the prism structure includes a plurality of prism groups, and the first surface and the second surface are two opposite surfaces of the glass base, respectively; and assembling the first base and the glass base, wherein orthographic projections of the plurality of superlenses on the first base at least partially overlap with orthographic projections of the plurality of mini light-emitting diode chips on the first base, respectively, orthographic projections of the plurality of wire grates on the first base at least partially overlap with the orthographic projections of the plurality of superlenses on the first base, respectively, and orthographic projections of the plurality of prism groups on the first base are located between the orthographic projections of two adjacent wire grates on the first base, respectively.

BRIEF DESCRIPTION OF THE DRAWINGS

Through following descriptions of the present disclosure with reference to the drawings, other purposes and advantages of the present disclosure will become apparent and a comprehensive understanding of the present disclosure may be obtained.

Figure 1:
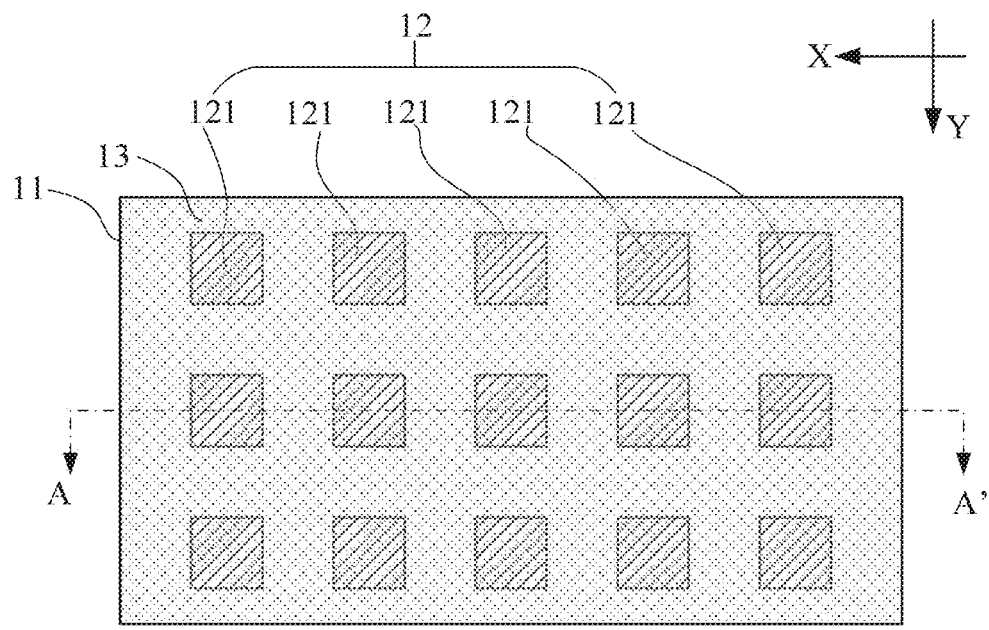
FIG. 1 is a schematic plan view of a backlight module according to some exemplary embodiments of the present disclosure.

It should be noted that, for clarity, sizes of layers, structures, or regions may be enlarged or reduced in the drawings for describing the embodiments of the present disclosure, that is, the drawings are not drawn according to actual scale.

DETAILED DESCRIPTION OF EMBODIMENTS

In the following descriptions, for purpose of explanation, many specific details are set forth to provide a comprehensive understanding of various exemplary embodiments. However, it is obvious that the various exemplary embodiments may be implemented without these specific details or with one or more equivalent arrangements. In other cases, well-known structures and devices are shown in forms of block diagrams to avoid unnecessarily obscuring the various exemplary embodiments. In addition, the various exemplary embodiments may be different, but are not necessary to be exclusive. For example, without departing from an inventive concept, specific shapes, configurations, and characteristics of an exemplary embodiment may be used or implemented in another exemplary embodiment.

In the drawings, for purposes of clarity and/or description, a size and a relative size of an element may be enlarged. In this way, the size and the relative size of each element are not necessary to be limited to the size and the relative size shown in the drawings. When the exemplary embodiments may be implemented differently, a specific process sequence may be performed differently from the sequence described. For example, two consecutively described processes may be performed substantially simultaneously or in a sequence opposite to the sequence described. In addition, the same reference numerals indicate the same elements.

When an element is described as being "on", "connected to" or "coupled to" another element, the element may be directly on the another element, directly connected to the another element or directly coupled to the another element, or an intermediate element may be present. However, when an element is described as being "directly on", "directly connected to" or "directly coupled to" another element, there is no intermediate element. Other terms and/or expressions used to describe the relationship between elements should be interpreted in a similar manner, for example, "between" and "directly between", "adjacent" and "directly adjacent", "on" and "directly on", etc. In addition, a term "connect" may refer to a physical connection, an electrical connection, a communication connection, and/or a fluid connection. In addition, X axis, Y axis, and Z axis are not limited to three axes of a Cartesian coordinate system, which may be interpreted in broader meaning. For example, the X axis, the Y axis, and the Z axis may be perpendicular to each other, or may represent different directions that are not perpendicular to each other. For the purpose of the present disclosure, "at least one of X, Y, and Z" and "at least one selected from a group consisting of X, Y, and Z" may be interpreted as only X, only Y, only Z, or any combination of two or more of X, Y, and Z such as XYZ, XY, YZ, and XZ. As shown in the present disclosure, a term "and/or" includes any and all combinations of one or more of the related items.

It should be understood that although terms "first", "second", etc. may be used to describe various elements, these elements should not be limited by these terms. Actually, the terms are only used to distinguish one element from another element. For example, without departing from a range of the exemplary embodiment, a first element may be referred to as a second element, similarly, a second element may be referred to as a first element.

In the present disclosure, an inorganic light-emitting diode refers to a light-emitting element made of an inorganic material, wherein LED refers to an inorganic light-emitting element different from OLED. Specifically, the inorganic light-emitting element may include a Mini Light-Emitting Diode (Mini LED) and a Micro Light-Emitting Diode (Micro LED). The Mini Light-Emitting Diode (Mini LED) represents a small light-emitting diode with a grain size between Micro LED and traditional LED. Generally, the grain size of the Mini LED may be between 100 and 300 microns.

Some exemplary embodiments of the present disclosure provide a backlight module, a method of manufacturing the backlight module, and a display device. For example, some embodiments of the present disclosure provide a backlight module, including: a first substrate and a second substrate. The first substrate includes: a first base; a mini light-emitting diode chip array arranged on the first base, and the mini light-emitting diode chip array includes a plurality of mini light-emitting diode chips; an encapsulation layer arranged on the first base and covering the mini light-emitting diode chip array; and a superlens array arranged on a surface of the encapsulation layer away from the first base, and the superlens array includes a plurality of superlenses. The second substrate is stacked on the first substrate, and the second substrate includes: a second base, the second base has a first surface close to the first substrate and a second surface away from the first substrate; a wire grate array arranged on the first surface, and the wire grate array includes a plurality of wire grates; and a prism structure arranged on the second surface, the prism structure includes a plurality of prism groups. The second base is a glass base, orthographic projections of the plurality of superlenses on the first base at least partially overlap with orthographic projections of the plurality of mini light-emitting diode chips on the first base, respectively, orthographic projections of the plurality of wire grates on the first base at least partially overlap with orthographic projections of the plurality of superlenses on the first base, respectively, and orthographic projections of the plurality of prism groups on the first base are located between orthographic projections of two adjacent wire grates on the first base, respectively. In this way, the superlenses are arranged on a light-emitting side of the mini LED, which may achieve an optical device with an ultra-short focal length, and may reduce a light mixing distance. In addition, each of the wire grates and the prisms is arranged on the glass base, a separate optical film is not required, which is conducive to simplifying a structure of the backlight module and achieving lightness and thinness of the backlight module.

Figure 2:
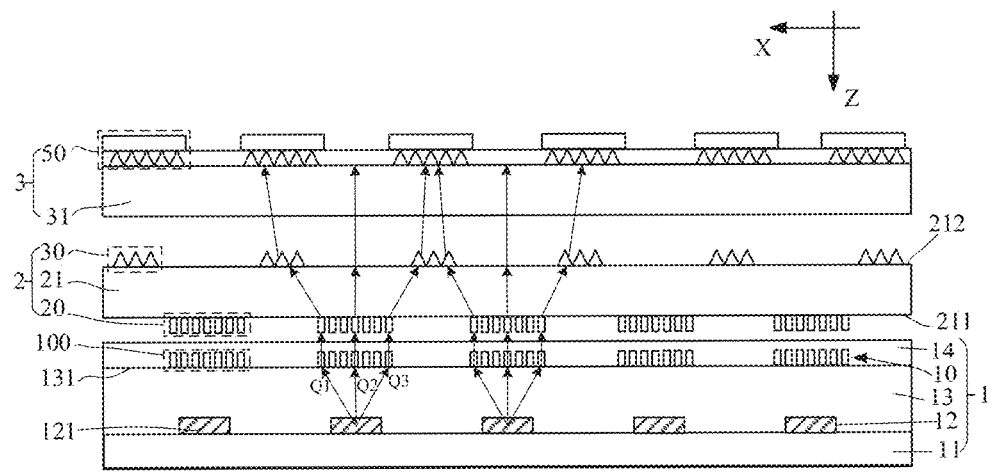
FIG. 2 is a cross-sectional view of the backlight module taken along line A-A' in FIG. 1 according to some exemplary embodiments of the present disclosure.

FIG. 1 is a schematic plan view of a backlight module according to some exemplary embodiments of the present disclosure, and FIG. 2 is a cross-sectional view of the backlight module taken along line A-N in FIG. 1 according to some exemplary embodiments of the present disclosure. It should be noted that, in FIG. 1, in order to clearly illustrate a light source included in the backlight module, optical elements included in the backlight module are omitted, and the optical elements will be shown in other drawings.

Referring to FIGS. 1 and 2, the backlight module according to the embodiments of the present disclosure may include a first substrate 1 and a second substrate 2 that are stacked.

For example, the first substrate 1 may be a mini LED light board. The mini LED light board may include a first base 11, a mini LED chip array 12 arranged on the first base 11, and an encapsulation layer 13 covering the mini LED chip array 12. For example, the encapsulation layer 13 includes a layered structure for encapsulating the mini LED chip array 12 on the first base 11. In some exemplary embodiments, an encapsulation glue is coated on a surface of the Mini LED light board, and the encapsulation layer 13 is formed after drying. The encapsulation glue may include a transparent photo-curable or heat-curable resin, that is, the encapsulation layer 13 may include a transparent protective glue.

In the embodiments of the present disclosure, the first base 11 may be a glass base. For example, after wirings are formed on the glass base 11, a plurality of Mini LED chips are picked and placed to form a glass-based mini LED light board.

Optionally, the embodiments of the present disclosure are not limited thereto, and the first base 11 may include, but is not limited to, a printed circuit board (ie, PCB), a flexible circuit board (ie, FPC), and the like. For example, the first base 11 may include a glass base on which a polyimide (PI) layer may be further arranged, or the glass substrate may further be connected with an FPC and/or a PCB.

It should be noted that a rectangular frame is used to represent a LED chip in FIG. 1 and FIG. 2. However, it should be understood that the LED chip in the embodiments of the present disclosure is not limited to the rectangle, and may be any shape such as a circle, a polygon, etc.

The mini LED chip array 12 may include a plurality of mini LED chips 121, and the plurality of mini LED chips 121 are arranged at intervals in a first direction X and a second direction Y, that is, arranged in an array on the first base 11. Each mini LED chip 121 is in electrical communication with the first base 11. For example, the first base 11 may be a PCB (Printed Circuit Board, printed first base) or the like. The first base 11 is provided with welding brackets corresponding to the mini LED chips, and the mini LED chips are welded on the corresponding welding brackets to form the mini LED chip array 12. It should be understood that a density of the mini LED chip array 12 depends on a power of the LED chips, a power of the LED light board and a brightness requirement.

For example, the first direction X and the second direction Y are perpendicular to each other, and a third direction Z is perpendicular to both the first direction X and the second direction Y.

In the embodiments of the present disclosure, the mini LED is applied in the backlight module, which is conducive to achieve a more refined local dimming design of the backlight module, achieve a high dynamic contrast ratio, and achieve a divisional dimming. In this way, the backlight module may have advantages of better light transmittance uniformity, higher contrast ratio and more lightness details.

Figure 3:
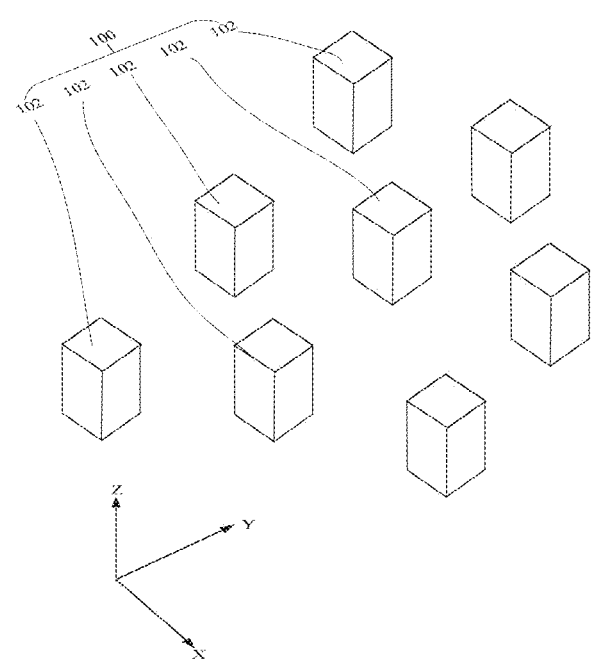
FIG. 3 is a partial enlarged view of an optical element arranged on a first substrate included in a backlight module according to some exemplary embodiments of the present disclosure.

FIG. 3 is a partial enlarged view of an optical element arranged on a first substrate included in a backlight module according to some exemplary embodiments of the present disclosure. Referring to FIGS. 2 and 3, the first substrate 1 may further include a superlens array 10. Specifically, the superlens array 10 may include a plurality of superlenses 100 arranged on a surface of the encapsulation layer 13 away from the first base 11. Each superlens 100 may include a plurality of columnar microstructures 102. For ease of description, the surface of the encapsulation layer 13 away from the first base 11 is referred to as the first surface 131. The plurality of columnar microstructures 102 are spaced apart in an array on the first surface 131. For example, each columnar microstructure 102 is substantially perpendicular to the first surface 131. Each columnar microstructure 102 may be cylindrical or prismatic, that is, an orthographic projection of each columnar microstructure 102 on the first surface 131 may be circular, rectangular, polygonal, etc.

For example, the plurality of superlenses 100 may correspond to a plurality of columns of mini LED chip arrays 12 in one-to-one correspondence, that is, an orthographic projection of each superlens 100 on a second base 21 at least partially overlaps with an orthographic projection of a column of mini LED chips 121 on the second base 21. For example, the orthographic projection of each superlens 100 on the second base 21 may cover the orthographic projection of a column of mini LED chips 121 on the second base 21.

Each columnar microstructure 102 may have a sub-wavelength shape size. Specifically, when the plurality of columnar microstructures 102 are used to perform a desired optical function with respect to light of a predetermined wavelength band, if $\lambda$ is a wavelength within the predetermined wavelength band, the sub-wavelength represents a shape size smaller than $\lambda$. In an exemplary embodiment, when the plurality of columnar microstructures 102 are used to perform the desired optical function with respect to light of the predetermined wavelength band, the plurality of columnar microstructures 102 are used to broaden the predetermined wavelength band to a desired degree and also prevent or reduce a generation of unintended higher or zeroth order diffraction noise more effectively.

For example, a wavelength of light (such as blue light) emitted by the mini LED chip 121 is $\lambda$, and sizes of each columnar microstructure 102 in the first direction X, the second direction Y and the third direction Z may be equal to the above wavelength or at a level of sub-wavelength. For example, the sizes of each columnar microstructure 102 in the first direction X, the second direction Y and the third direction Z may be in a range of $0.01\lambda$ to $100\lambda$. Alternatively, all the sizes may be smaller than the wavelength $\lambda$.

Optionally, in each superlens 100, spacing distances between two adjacent columnar microstructures 102 in the first direction X and the second direction Y may both be equal to the above wavelength or at the level of sub-wavelength. For example, the spacing distances between two adjacent columnar microstructures 102 in the first direction X and the second direction Y may be in a range of $0.01\lambda$ to $100\lambda$. Alternatively, the spacing distances may both be smaller than the wavelength $\lambda$.

For another example, a material of the superlens array 10 may contain at least one of c-Si, p-Si, a-Si, III-V compound semiconductors (gallium phosphide (GaP), gallium nitride (GaN), gallium arsenide (GaAs) etc.), silicon carbide (SiC), titanium dioxide ($TiO_2$) and silicon nitride (SiN).

In the embodiments of the present disclosure, by arranging the superlens on a light-emitting side of the mini LED, a diffraction limit of light may be broken, and an optical device with an ultra-short focal length may be achieved, which may meet requirements of the mini LED backlight module for a shorter light mixing distance (several hundred microns). In this way, the light mixing distance may be reduced, which is beneficial to achieve lightness and thinness of the backlight module.

Optionally, the first substrate 1 may further include a protective layer 14. The protective layer 14 may cover or encapsulate the superlens array 10 to protect the superlens array 10. For example, a refractive index of a material of the protective layer 14 may be different from a refractive index of the material of the superlens array 10. A difference in the refractive indexs between the material of the protective layer 14 and the material of the superlens array 10 may be 0.5 or more. The protective layer 14 may contain a material having a refractive index less than the refractive index of the superlens array 10. Of course, the embodiments of the present disclosure are not limited thereto, and in some embodiments, the protective layer 14 may be omitted. In other embodiments, the refractive index of the protective layer 14 may be greater than the refractive index of the superlens array 10.

For example, the protective layer 14 may contain a polymer material such as epoxy (SU-8), polymethyl methacrylate (PMMA), etc., or a low-refractive material such as silicon dioxide ($SiO_2$).

The second substrate 2 may include a second base 21 having a first surface 211 and a second surface 212. The first surface 211 is a surface of the second base 21 close to the first base 1, and the second surface 212 is a surface of the second base 21 away from the first base 1. For example, the second base 21 may be a glass base.

The second substrate 2 may further include a wire grate array 20 and a prism structure 30. The wire grate array 20 is arranged on the first surface 211, and the prism structure 30 is arranged on the second surface 212.

Figure 4:
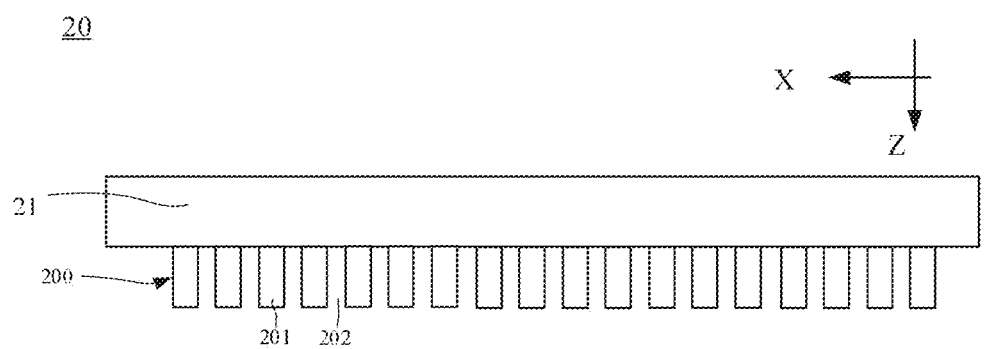
FIG. 4 is a schematic structural diagram of a wire grate array included in a second substrate according to some exemplary embodiments of the present disclosure.

FIG. 4 is a schematic structural diagram of a wire grate array included in a second substrate according to some exemplary embodiments of the present disclosure. Referring to FIGS. 2 and 4, the wire grate array 20 may be a nano-scale wire grate device. Specifically, the wire grate array 20 may include a plurality of wire grates 200. For example, the plurality of wire grates 200 may correspond to the plurality of columns of mini LED chips 121 in one-to-one correspondence, that is, an orthographic projection of each wire grate 200 on the second base 21 at least partially overlaps with the orthographic projection of a column of mini LED chips 121 on the second base 21. For example, the orthographic projection of each wire grate 200 on the second substrate 21 may cover the orthographic projection of a column of mini LED chips 121 on the second base 21.

Optionally, the plurality of wire grates 200 may be integrally formed with the second base 21. Alternatively, the first surface 211 of the second substrate 21 may be a flat surface, and the plurality of wire grates 200 may be manufactured on the flat first surface 211, that is, the plurality of wire grates 200 are structures independently formed on the second base 21.

Each wire grate 200 may include a plurality of protrusions 201 and a plurality of grooves 202, and the plurality of protrusions 201 and the plurality of grooves 202 are alternately arranged. In the embodiments of the present disclosure, the wire grate 200 may be a diffraction wire grate. It should be understood that, according to an optical principle, after light encounters an opaque or transparent obstacle or a small hole (slit) in a propagation path, a phenomenon in which the light travels around obstacles and deviates from a straight line is called diffraction of light. Referring to FIG. 4, the diffraction wire grate 200 is formed by providing a plurality of grooves or protrusions that are regularly arranged on the first surface 211, the plurality of grooves or protrusions that are regularly arranged form a regular structure, and light propagating in a straight line deviates from the straight line propagation direction after transmitting through the grooves. As shown in FIG. 4, the plurality of grooves or protrusions are formed on the surface of the transparent second base 21, and the plurality of grooves or protrusions are regularly arranged. The groove serves as a light-transmitting area with a width of w1, the protrusion between the grooves serves as a non-light-transmitting area with a width of w2, and a diffraction wire grate with a wire grate period p is thus formed, and p=w1+w2.

Optionally, the wire grate 200 may be a nano-scale wire grate device. For example, the wire grate 200 may be designed within 1800 reticles to 3600 reticles. As another example, a diffraction angle of the wire grate 200 may be about 60°.

Optionally, a height (i.e. a size in a direction perpendicular to the first surface 211) of the wire grate 200 may be substantially equal to the wire grate period p.

By providing a reasonable wire grate period p and/or wire grate height, a new light spot may be formed between two mini LED chips 121, so as to achieve an effect of homogenizing light ray.

Figure 9A:
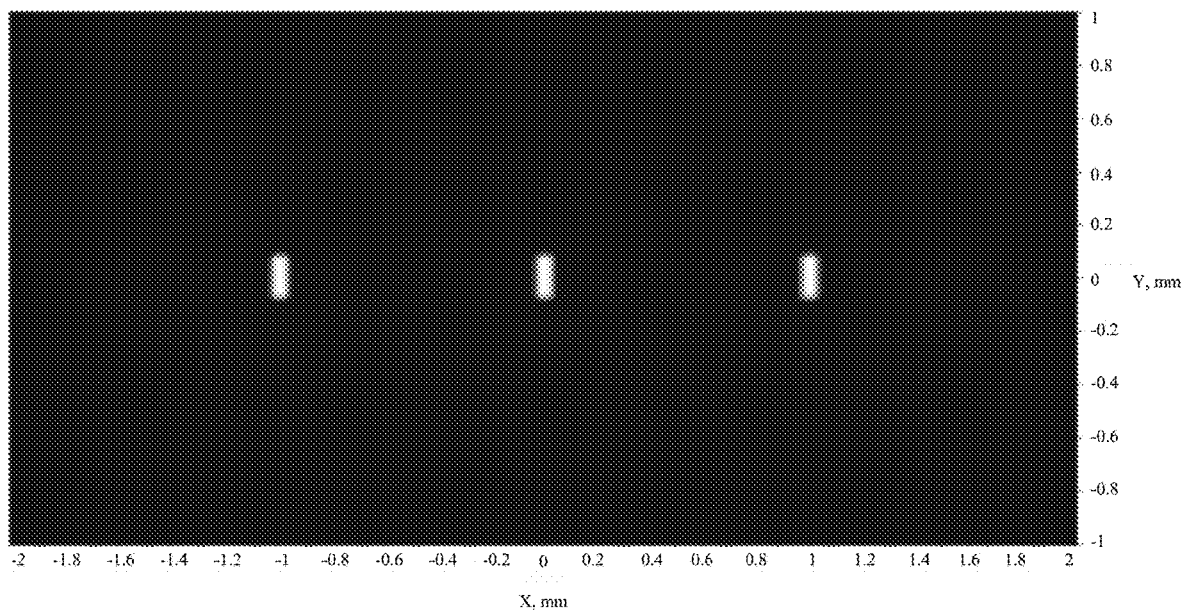
FIG. 9A and FIG. 9B are optical simulation diagrams of not arranging a wire grate array and arranging a wire grate array, respectively.
Figure 9B:
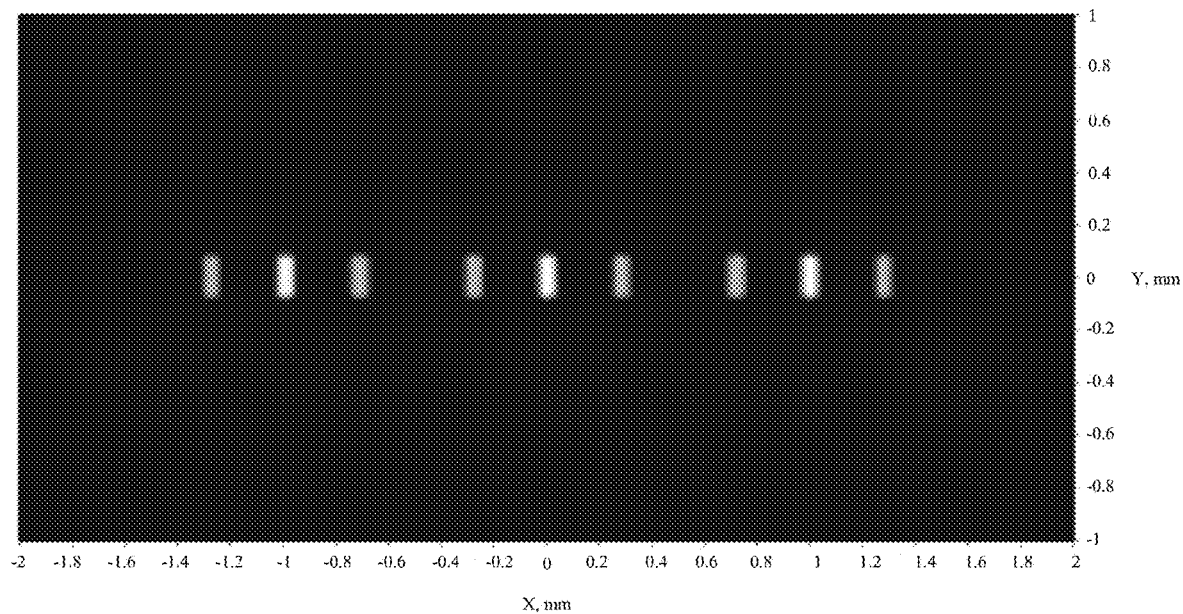

FIG. 9A and FIG. 9B are optical simulation diagrams of not arranging a wire grate array and arranging a wire grate array, respectively. Referring to FIGS. 9A and 9B, an abscissa and an ordinate respectively represent position coordinates of the mini LED chip 121 in the first direction X and the second direction Y whose units are millimeters. As shown in the drawings, by providing the wire grate array 20, the number of light spots is significantly increased. For example, in one same area, in the case that the wire grate array 20 is not arranged, the number of light spots is 3; in the case that the wire grate array 20 is arranged, the number of light spots is 9. In this way, the light homogenizing effect of the backlight module is enhanced. It should be noted that the light spot reflects an energy distribution of the light. The greater the number of the light spots, the more uniform the energy distribution of light, that is, the light homogenizing effect is better. For example, in the examples shown in FIGS. 9A and 9B, assuming that an energy of light emitted by one mini LED chip 121 is E, three light spots are present in FIG. 9A, so that the energy of each light spot is ⅓ of E; nine light spots are present in FIG. 9B, so that the energy of each light spot is ⅑ of E. In this way, the energy distribution of the light in FIG. 9B is more uniform, that is, the light homogenizing effect is better.

Figure 5:
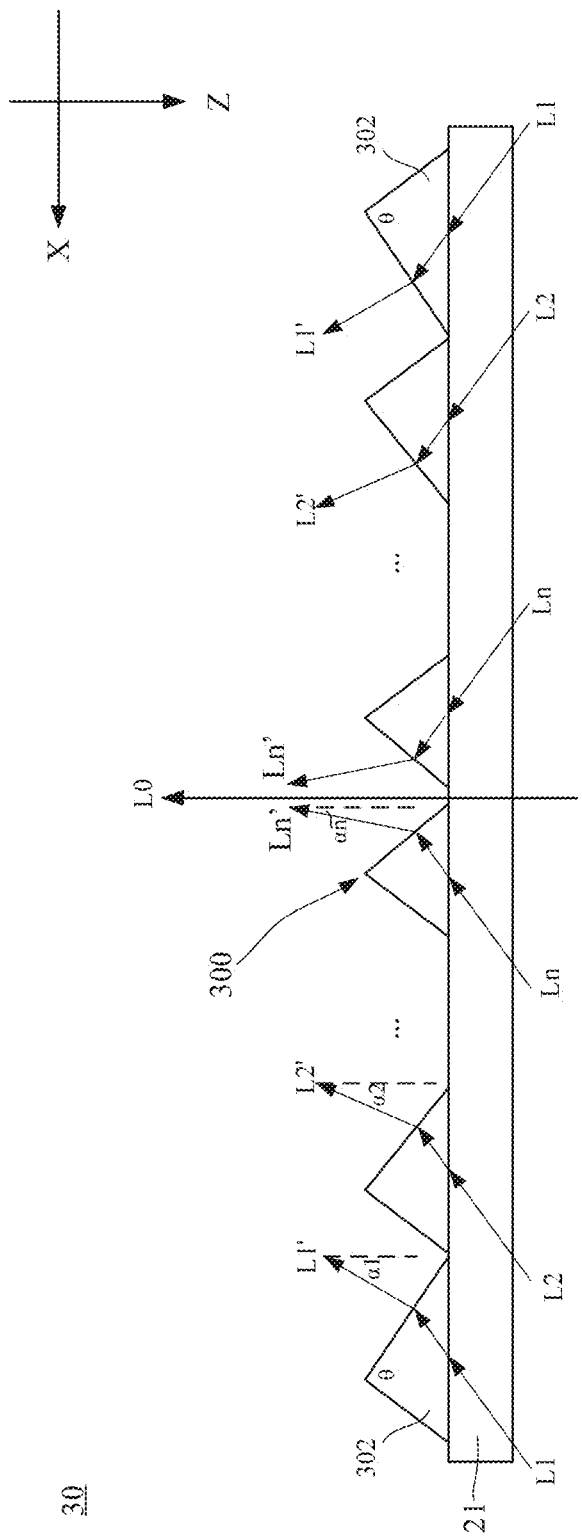
FIG. 5 is a schematic structural diagram of a prism structure included in a second substrate according to some exemplary embodiments of the present disclosure.

FIG. 5 is a schematic structural diagram of a prism structure included in a second substrate according to some exemplary embodiments of the present disclosure. Referring to FIGS. 2 and 5, the prism structure 30 includes a plurality of prism groups 300. Each prism group 300 may include a plurality of prisms 302. For example, each prism 302 may extend in the second direction Y, that is, each prism 302 may be a strip prism. The plurality of prisms 302 include in each prism group 300 extend in the second direction Y and are arranged in the first direction X.

The plurality of prism groups 300 are arranged at intervals in the first direction X. An orthographic projection of each prism group 300 on the second base 21 does not overlap with an orthographic projection of each wire grate 200 or each column of mini LED chips 121 on the second base 21. For example, the orthographic projection of each prism group 300 on the second base 21 is located between orthographic projections of two adjacent wire grates 200 on the second base 21. Alternatively, the orthographic projection of each prism group 300 on the second base 21 is located between orthographic projections of two adjacent columns of mini LED chips 121 on the second base 21.

As shown in FIG. 5, each prism 302 is a triangular prism. For example, a cross-section of each prism 302 may be an asymmetrical triangle. Each prism 302 has an apex angle θ. The apex angle θ is located on a side of the prism 302 away from the second surface 212.

Figure 6A:
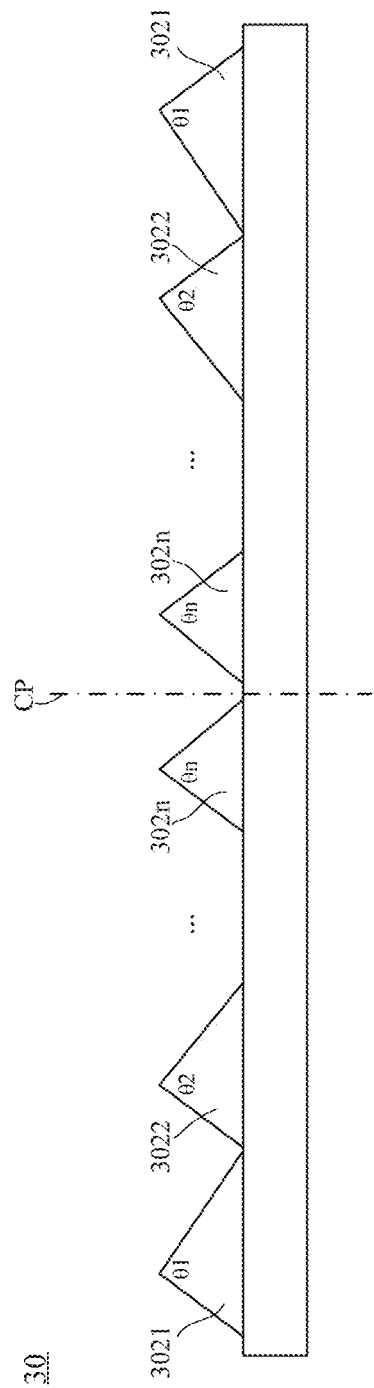
FIGS. 6A and 6B are schematic structural diagrams of a prism group included in a prism structure according to some exemplary embodiments of the present disclosure, respectively.
Figure 6B:
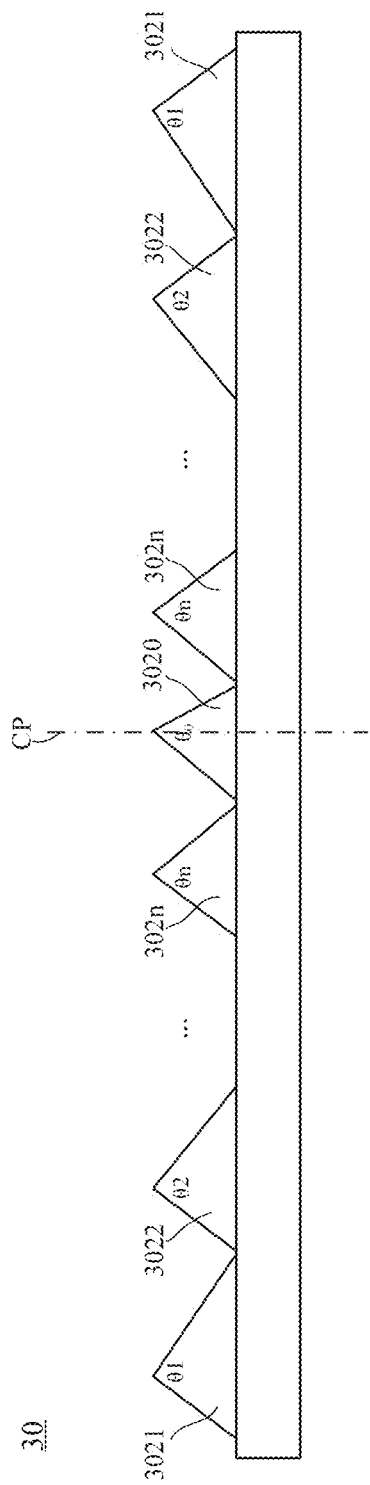

Referring to FIGS. 6A and 6B, a symmetry plane CP is arranged for a prism group 300, and the symmetry plane CP is perpendicular to the second surface 212 and extends in the second direction Y. The symmetry plane CP extends through a middle position of two adjacent wire grates 200. In other words, a spacing distance X in the first direction X between an orthographic projection of the symmetry plane CP on the first surface 211 and one of two adjacent wire grates 200 is equal to a spacing distance in the first direction between the orthographic projection of the symmetry plane CP on the first surface 211 and the other of the two adjacent wire grates 21.

For a prism group 300, apex angles θ of at least some of the plurality of prisms 302 are different from each other. Optionally, a prism group 300 has a plane-symmetric structure that is symmetrical with respect to the symmetry plane CP.

For example, as shown in FIG. 6A, the symmetry plane CP does not extend through any prism 302, that is, the symmetry plane CP is located between two adjacent prisms 302. A prism group 300 includes 2n prisms 302, and n is a natural number. At this time, n prisms 302 are arranged on any one side of the symmetry plane CP, respectively.

For ease of description, the n prisms 302 located on a side of the symmetry plane CP are numbered in sequence, a prism farthest from the symmetry plane CP is numbered 3021, a prism adjacent to the prism 3021 and closer to the symmetry plane CP is numbered 3022, and so on, and a prism closest to the symmetry plane CP is numbered 302n. Similarly, the n prisms 302 located on the other side of the symmetry plane CP are also numbered in sequence, an apex angle θ of the prism 3021 may be labeled as θ1, an apex angle θ of the prism 3022 may be labeled as θ2, and so on, and a apex angle θ of the prism 302n may be labeled as θn.

Optionally, the apex angles θ1, θ2, ..., θn may be gradually changed, eg, gradually decreased. The apex angles θ1, θ2, ..., θn may be gradually decreased by a fixed difference, that is, the values of the apex angles θ1, θ2, ..., θn form a set of an arithmetic progression.

For example, the values of the apex angles θ1, θ2, ..., θn may be in a range of 40° to 80°, and the fixed difference may be about 0.5°.

For another example, as shown in FIG. 6B, the symmetry plane CP extends through a prisms 302. A prism group 300 includes 2n+1 prisms 302, and n is a natural number. At this time, n prisms 302 are arranged on any one side of the symmetry plane CP, respectively.

For ease of description, a prism 302 through which the symmetry plane CP extends is numbered 3020, n prisms 302 located on a side of the symmetry plane CP are numbered in sequence, a prism farthest from the symmetry plane CP is numbered 3021, a prism adjacent to the prism 3021 and closer to the symmetry plane CP is numbered 3022, and so on, and a prism closest to the symmetry plane CP is numbered 302n. Similarly, n prisms 302 located on the other side of the symmetry plane CP are also numbered in sequence. An apex angle θ of the prism 3020 may be labeled as θ0, an apex angle θ of the prism 3021 may be labeled as θ1, an apex angle θ of the prism 3022 may be labeled as θ2, and so on, and a apex angle θ of the prism 302n may be labeled as θn.

Optionally, the apex angles θ1, θ2, ..., θn may be gradually changed, eg, gradually decreased. The apex angles θ1, θ2, ..., θn may be gradually decreased by a fixed difference, that is, the values of the apex angles θ1, θ2, ..., θn may form a set of an arithmetic progression. Optionally, a difference between the apex angle θn and the apex angle θ0 may be equal to the fixed difference, that is, the values of the apex angles θ1, θ2, ..., θn and θ0 may form a set of an arithmetic progression. Of course, the difference between the apex angle θn and the apex angle θ0 may not be equal to the fixed difference.

For example, the values of the apex angles θ1, θ2, ..., θn and θ0 may be in a range of 40° to 80°, and the fixed difference may be about 0.5°.

FIG. 5 schematically shows a schematic diagram of light rays passing through a prism group 300. Light rays L1, L2, ..., Ln incident on the prisms 3021, 3022, ..., 302n by the same incident angle are emitted after being refracted by the prisms. Emitted light rays L1', L2', ..., Ln' form certain angles α1, α2, ..., αn with a normal line L0 (a straight line perpendicular to the second surface), respectively. Values of the angles α1, α2, ..., αn gradually decrease. That is, propagation directions of some large-angle light rays are changed after being refracted by the prisms, so that a directional emitting of light may be achieved, and a light efficiency of the backlight module is improved. Moreover, each emitted light ray gradually approaches the direction of the normal line, so as to achieve a convergence of the light rays, which is beneficial to enhance the light homogenizing effect of the backlight module. In other words, by means of triangular microstructures with a series of gradually changed angles, the large-angle light ray may be concentrated and emitted in a positive direction. In this way, the unusable light that was scattered at large angles may be emitted from a front surface, which not only improves the light efficiency, but also increases the light energy from the front surface.

Figure 10:
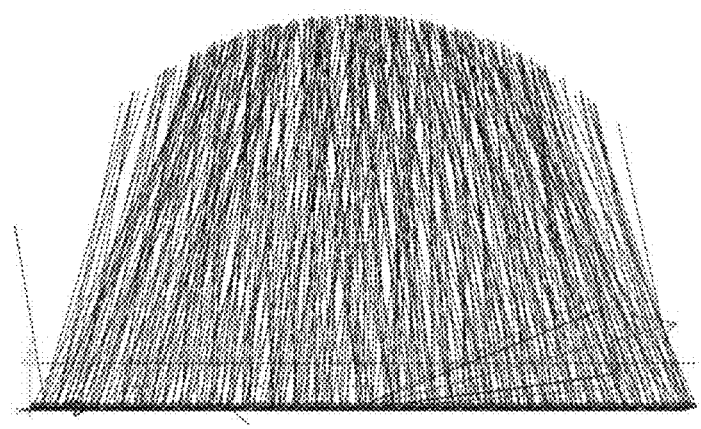
FIG. 10 is an optical simulation diagram of light rays passing through a prism structure.

FIG. 10 is an optical simulation diagram of light rays passing through a prism structure 30. Referring to FIG. 10, by means of triangular microstructures with a series of gradually changed angles, light rays at large angles ray may be concentrated and emitted in the positive direction. It should be noted that, in FIG. 10, lines with arrows in the lower left corner represent the coordinate system, and some bars with arrows in the lower right corner represent extension lines of an incident direction of light rays incident on the prism structure 30. It should be understood that the incident light rays may have large incident angles and are inclined at large angles. As shown in FIG. 10, after passing through the prism structure 30, the light rays with large incident angles may be emitted from the positive direction.

Hereinafter, an optical path of the backlight module according to the embodiments of the present disclosure will be described in detail with reference to the drawings.

For the backlight module shown in FIG. 2, light rays Q1, Q2, and Q3 emitted from the mini LED chip 121 are incident on the superlens 100. The light emitted from the mini LED chip 121 has a Lambertian distribution. After being shaped by the superlens 100, the light emitted from the superlens 100 has a near-collimated distribution. Then, the light rays Q1, Q2 and Q3 of near-collimated distribution are incident on the wire grate 200. A LED light spot is diffracted into a plurality of LED light spots through the wire grate 200. The light rays emitting from the wire grate 200 are formed as divergent light rays with certain angles. Next, the light rays Q1, Q2 and Q3 emitted from the wire grate 200 are incident on the prism groups 300. The light with high diffraction order is adjusted to be emitted in the positive direction (for example, the upward direction shown in the drawing) through the prisms 302, thereby forming the light spots in the positive direction and improving the light homogenizing effect.

Optionally, the first substrate 1 and the second substrate 2 do not need to be fixed by components such as an optical glue, etc. In a specific implementation, the wire grate 200 may be in direct contact with a light-emitting surface of the superlens 100, and there is only an air medium filling a gap between the wire grate 200 and the superlens 100 between the wire grate 200 and the superlens 100. It should be noted that, in FIG. 2, for ease of description, the wire grate 200 is not in contact with the light-emitting surface of the superlens 100.

Referring back to FIG. 2, the backlight module according to the embodiments of the present disclosure may include a third substrate 3 stacked on a side of the second substrate 2 away from the first substrate 1.

Figure 7:
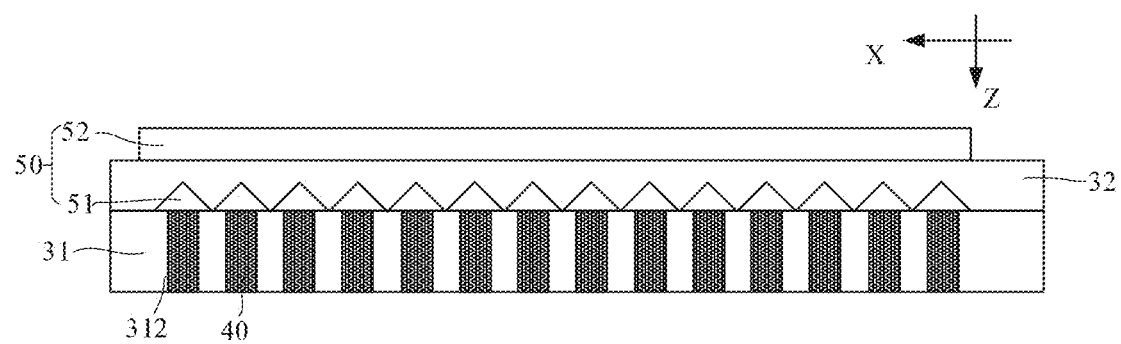
FIG. 7 is a schematic structural diagram of a third substrate included in a backlight module according to some exemplary embodiments of the present disclosure.

FIG. 7 is a schematic structural diagram of a third substrate included in a backlight module according to some exemplary embodiments of the present disclosure. Referring to FIG. 2 and FIG. 7, the third substrate 3 may include a third base 31. For example, the third base 31 may be a glass base.

Optionally, the third base 31 may be provided with a plurality of holes 312 therein, and the plurality of holes 312 may be filled with a quantum dot material 40, respectively. For example, the quantum dot material 40 may include a red quantum dot that emits red light after being excited by blue light and/or a green quantum dot that emits green light after being excited by the blue light. However, the embodiments of the present disclosure are not limited thereto, and the quantum dot material 40 may also include a yellow quantum dot that emits yellow light after being excited by the blue light. By providing such quantum dot material, an optical effect of converting light of blue light chip into white light for emission may be achieved. Specifically, the light emitted from the mini LED chip 121 is blue light. When the blue light passes through the quantum dot material 40, part of the blue light is converted into the red light and the green light under the excitation of the blue light. Next, the red light, the green light and the unconverted blue light are then mixed to form the white light.

Referring to FIG. 7, the third substrate 3 may further include a brightness enhancement structure 50. Optionally, the brightness enhancement structure 50 may be arranged on a surface of the third base 31 away from the second substrate 2.

Figure 8:
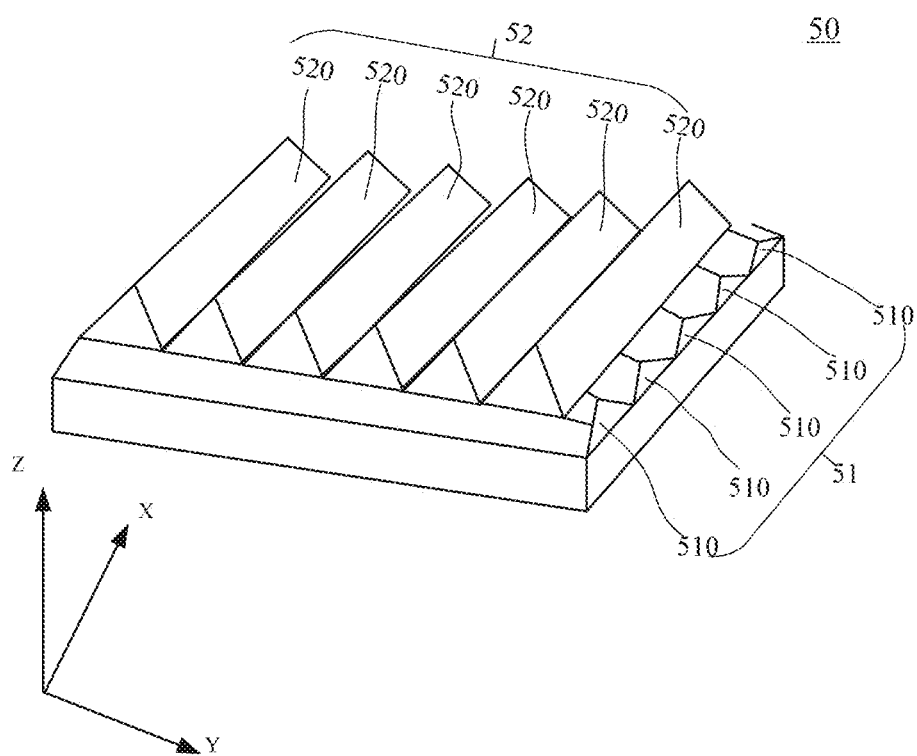
FIG. 8 is a schematic perspective view of a brightness enhancement structure according to some exemplary embodiments of the present disclosure.

FIG. 8 is a schematic perspective view of a brightness enhancement structure according to some exemplary embodiments of the present disclosure. Referring to FIGS. 7 and 8, the brightness enhancement structure 50 may include a first prism group 51 and a second prism group 52. An orthographic projection of the brightness enhancement structure 50 on the second base at least partially overlaps with an orthographic projection of the prism structure 30 on the second base. For example, the orthographic projection of the brightness enhancing structure 50 on the second base covers the orthographic projection of the prism structure 30 on the second base. Specifically, an orthographic projection of each of the first prism group 51 and the second prism group 52 on the second base covers the orthographic projection of the prism structure 30 on the second base.

The first prism group 51 may include a plurality of first prisms 510, the second prism group 52 may include a plurality of second prisms 520. Each first prism 510 extends in the second direction Y, and each second prism 520 extends in the first direction X. The plurality of first prisms 510 included in the first prism group 51 are arranged in the first direction X, and the plurality of second prisms 520 included in the second prism group 52 are arranged in the second direction Y.

For example, each of the first prisms 510 and the second prisms 520 may be a triangular prism. A cross section of the first prism 510 in a direction perpendicular to the second direction Y is an isosceles triangle, for example, may be an isosceles triangle with an apex angle equal to about 90°. A cross section of the second prism 520 in a direction perpendicular to the first direction X is an isosceles triangle, for example, may be an isosceles triangle with an apex angle equal to about 90°.

By providing the brightness enhancement structure 50, the light may be converged and emitted in a direction substantially perpendicular to the first direction X and the second direction Y, thereby achieving the purpose of brightness enhancement.

Optionally, the third substrate 3 may include a planarization layer 32 between a layer where the first prism group 51 is located and a layer where the second prism group 52 is located. For example, a material of the planarization layer 32 may contain an optical glue having low refractive index.

It should be noted that, in the specific design, the apex angle of each of the first prisms 510 and the second prisms 520 may be adjusted according to the refractive index of the optical glue used in the planarization layer 32.

Alternatively, the brightness enhancement structure 50 may be arranged on a surface of the third substrate 31 close to the second substrate 2.

In the embodiments of the present disclosure, various optical elements (such as the above-mentioned wire grate array 20, the prism structure 30, and the brightness enhancement structure 50, etc.) are all manufactured on the glass base, a separate optical film is not required, thereby an all-glass-based mini LED backlight module is thus achieved, which is beneficial to simplify the structure of the backlight module.

Figure 11A:
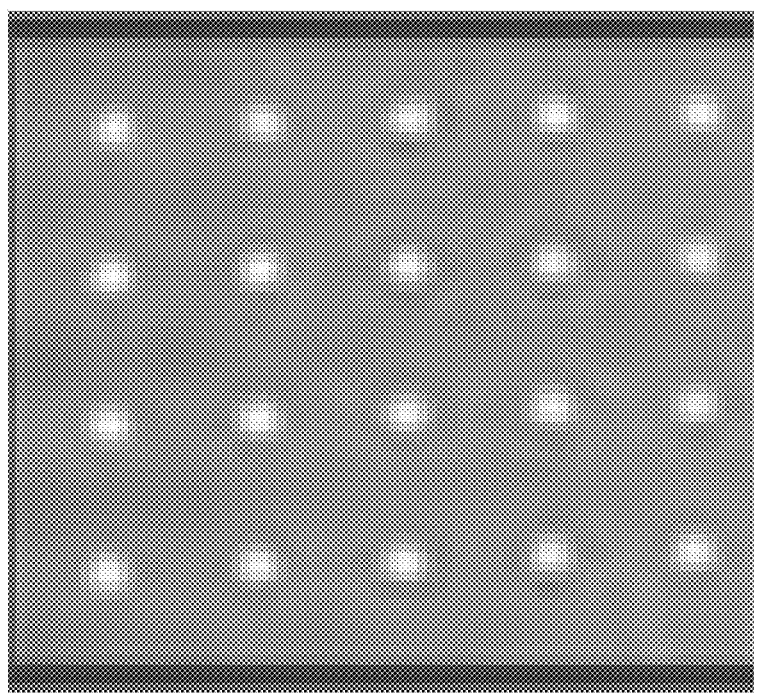
FIG. 11A is an optical simulation diagram of emitting light of a mini LED chip without arranging any optical element.
Figure 11B:
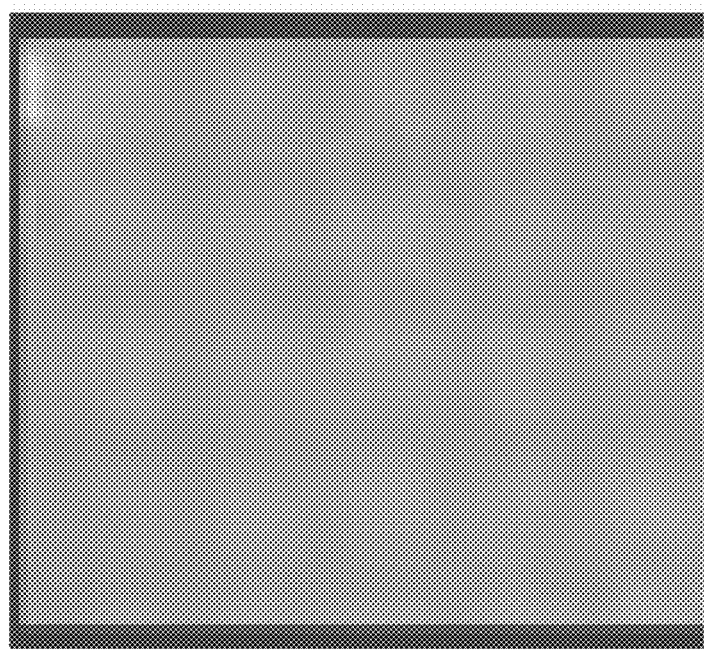
FIG. 11B is an optical simulation diagram of emitting light of a backlight module provided with a conventional optical film.
Figure 11C:
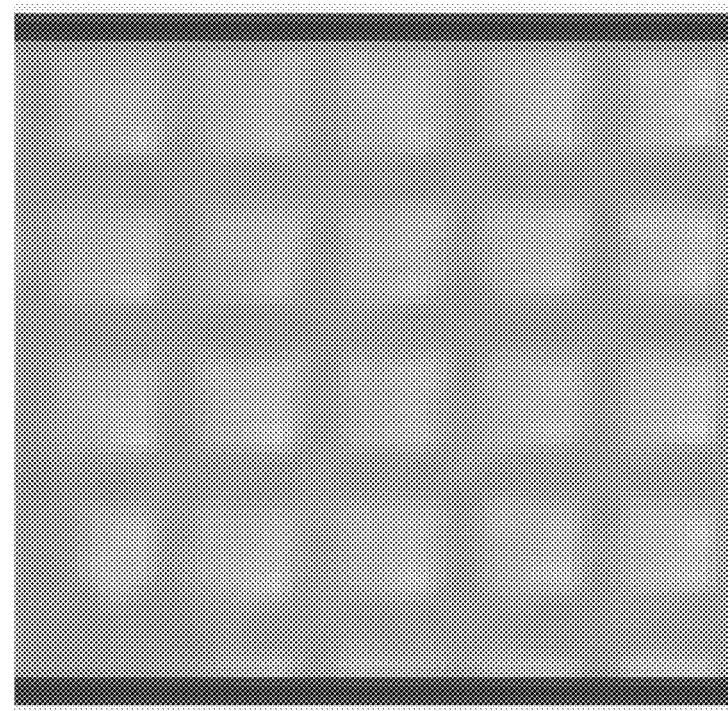
FIG. 11C is an optical simulation diagram of emitting light of a backlight module according to the embodiments of the present disclosure.

FIG. 11A is an optical simulation diagram of emitting light of a mini LED chip without providing any optical elements, FIG. 11B is an optical simulation diagram of emitting light of a backlight module provided with a conventional optical film, and FIG. 11C is an optical simulation diagram of emitting light of a backlight module according to the embodiments of the present disclosure. Referring to FIGS. 11A, 11B and 11C, in FIG. 11A, the small white circles represent places where energy of the light is larger, that is, the brighter parts are parts facing the mini LED chips; the dark gray parts represent places where the energy of the light is less, that is, the darker parts are parts between the mini LED chips. As shown in FIG. 11A, in the case of not providing any optical element, an area of the brighter part is small, which almost directly faces positions of the mini LED chips, and positions between mini LED chips are darker, resulting in a large brightness difference. In FIG. 11B, the whole part is gray, that is, there is no brighter part, and all the positions are relatively dark. As shown in FIG. 11B, in the case that the conventional optical film is provided, the overall light efficiency of the optical film is low, resulting in a relatively dark overall picture. In FIG. 11C, nearly white rectangular parts represent places where the energy of the light is larger, that is, the brighter parts; and the gray parts represents places where the energy of light is relatively small. As shown in FIG. 11C, in the case that the backlight module of the embodiments of the present disclosure is used, areas of the nearly white rectangular parts are larger, and the relatively dark parts are also gray, that is, areas of the high-energy parts are larger, and a brightness difference of each part is small. Therefore, in FIG. 11C, the energy distribution of the light is relatively uniform, and the light homogenizing effect is good.

That is to say, by utilizing the all-glass-based optical structure, the backlight module according to the embodiments of the present disclosure may significantly enhance the light homogenizing effect, and the brightness of the emitted light of the backlight module is significantly enhanced. For example, it is found through simulation experiments that, compared with FIG. 11B, the brightness of the backlight module according to the embodiments of the present disclosure is improved by 18.18%-32.26%. Moreover, since the brightness of the backlight module is enhanced, the power consumption of the mini LED light board may be reduced, thereby reducing a heat dissipation pressure of the backlight module, which is beneficial to prolong a product life.

In addition, the optical structure of the backlight module according to the embodiments of the present disclosure may be completely formed on the glass base, which is conducive to integrating a plurality of links involved in an industrial chain in one link, so as to achieve a single-production line production process of the glass-based mini LED backlight module, and maximize benefits of the glass process.

The Embodiments of the present disclosure also provide a method of manufacturing a backlight module. For example, the method may be performed according to the following steps.

In step S10, a superlens array 10 is formed on a first base 1.

Specifically, a glue may be coated on a base such as $SiO_2$, and then the glue layer may be patterned, so that a pattern of the glue layer corresponds to a pattern of a superlens array 10 to be formed. For example, electron beam exposure may be performed on the glue layer, and the exposed pattern corresponds to the pattern of the superlens array 10 to be formed, and the pattern of the glue layer is formed after dry etching or wet etching process. Next, a new material (such as TiO2) is grown on the glue layer through an atomic layer deposition process. Finally, remaining glue is removed by methods such as light irradiation or etching solution. At this time, a microstructure array formed of a material such as $TiO_2$ is formed on the base. Then, the microstructure array may be transferred onto a surface of an encapsulation layer 13 away from a first substrate 11 through a nano-imprinting process, thereby forming the superlens array 10.

In step S20, a wire grate array 20 and a prism structure 30 are formed on two surfaces 211 and 212 of a second substrate 2, respectively.

Specifically, the wire grate array 20 may be manufactured on the first surface 211 through an imprinting process. The prism structure 30 may be manufactured on the second surface 212 through a rolling process. For example, a prism mold may be obtained by rotary cutting through a cutter whose apex angle is smaller than a minimum apex angle (eg, 40°) of the above-mentioned prisms, and then a structure of the prism mold may be transferred to the second surface 212 through a rolling process, so as to form the prism structure 30.

In step S30, a quantum dot material 40 is formed in a third substrate 3, and a brightness enhancement structure 50 is formed on the third substrate 3.

Specifically, a plurality of holes 312 may be formed in a third base 31 of the third substrate 3, and then a quantum dot material 40 may be filled in the plurality of holes 312. Then, a surface of the third base 31 is coated with an optical glue, and a first prism group 51 is formed by an imprinting process. Next, a planarization layer 32 is formed on a surface of the first prism group 51 away from the third base 31. For example, the planarization layer 32 may be formed by an optical glue material having a low refractive index. Next, an optical glue is coated on a surface of the planarization layer 32 away from the third base 31, and a second prism group 52 is formed by an imprinting process.

It should be noted that, some steps of the above-mentioned manufacturing method may be performed individually or in combination, and may be performed in parallel or sequentially, and are not limited to a sequence of the specific operations shown in the drawings.

Figure 12:
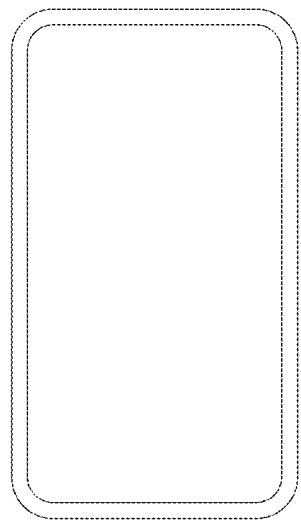
FIG. 12 is a schematic diagram of a display device according to some exemplary embodiments of the present disclosure.

Some exemplary embodiments of the present disclosure also provide a display device. FIG. 12 is a schematic diagram of a display device according to some exemplary embodiments of the present disclosure. Referring to FIG. 12, the display device includes the above-mentioned backlight module.

The display device may include any device or product with a display function. For example, the display device may be a smart phone, a mobile phone, a navigation apparatus. a television (TV), a laptop PC, a tablet PC, a car speaker body, a portable multimedia player (PMP), a personal digital assistant (PDA), etc.

It should be understood that the display device according to the embodiments of the present disclosure has all the characteristics and advantages of the above-mentioned backlight module. These characteristics and advantages may refer to the descriptions above of the backlight module, and will not be repeated here.

As used herein, the terms "substantially", "approximately", "about" and other similar terms are used as approximate terms rather than as terms of degree, and these terms are intended to explain an inherent deviation of a measured value or a calculated value recognized by those skilled in the art. Taking into factors such as process fluctuations, measurement problems, errors related to the measurement of specific quantities (ie. the limitations of the measurement system), etc., the "substantially" or "approximately" includes a stated value, and means that a specific value determined by those skilled in the art is within an acceptable deviation range. For example, "approximately" may mean within one or more standard deviations, or within ±10% or ±5% of the stated value.

Although some embodiments of the general technical concept of the present disclosure have been shown and illustrated, those of ordinary skill in the art will understand that changes can be made to these embodiments without departing from the principle and spirit of the general technical concept of the present disclosure. The scope of the present disclosure shall be defined by the claims and their equivalents.

What is claimed is:

1. A backlight module, comprising:
a first substrate, wherein the first substrate comprises:
  a first base;
  a mini light-emitting diode chip array arranged on the first base, and the mini light-emitting diode chip array comprises a plurality of mini light-emitting diode chips;
  an encapsulation layer arranged on the first base and covering the mini light-emitting diode chip array; and
  a superlens array arranged on a surface of the encapsulation layer away from the first base, and the superlens array comprises a plurality of superlenses; and
a second substrate stacked on the first substrate, wherein the second substrate comprises:
  a second base, and the second substrate has a first surface close to the first substrate and a second surface away from the first substrate;
  a wire grate array arranged on the first surface, and the wire grate array comprises a plurality of wire grates; and
  a prism structure arranged on the second surface, wherein the prism structure comprises a plurality of prism groups,
wherein the second base is a glass base, orthographic projections of the plurality of superlenses on the first base at least partially overlap with orthographic projections of the plurality of mini light-emitting diode chips on the first base, respectively, orthographic projections of the plurality of wire grates on the first base at least partially overlap with the orthographic projections of the plurality of superlenses on the first base, respectively, and orthographic projections of the plurality of prism groups on the first base are located between the orthographic projections of two adjacent wire grates on the first base, respectively.

2. The backlight module of claim 1, further comprising a third substrate stacked on a surface of the second substrate away from the first substrate, wherein the third substrate comprises:
- a third base, and the third base comprises a first surface close to the second substrate and a second surface away from the second substrate; and
- a brightness enhancement structure arranged on one of the first surface of the third substrate and the second surface of the third substrate,
- wherein the third base is a glass base, an orthographic projection of the brightness enhancement structure on the second base at least partially overlaps with the orthographic projection of the prism structure on the second base.

3. The backlight module of claim 2, wherein the third substrate further comprises:
- a plurality of holes arranged in the third base; and
- a quantum dot material filled in the plurality of holes.

4. The backlight module of claim 3, wherein the plurality of mini light-emitting diode chips are arranged as an array in a first direction and a second direction on the first base, the first direction and the second direction are perpendicular to each other, and a third direction is perpendicular to a plane in which the first direction and the second direction are located; and
- wherein each superlens comprises a plurality of columnar microstructures, and the plurality of columnar microstructures are arranged as an array in the first direction and the second direction on a surface of the encapsulation layer away from the first base.

5. The backlight module of claim 4, wherein a wavelength of light emitted by the mini light-emitting diode chip is $\lambda$, and sizes of each columnar microstructure in the first direction, the second direction and the third direction are all in a range of $0.01\lambda$ to $100\lambda$.

6. The backlight module of claim 5, wherein in each superlens, spacing distances between two adjacent columnar microstructures in both the first direction and the second direction are in a range of $0.01\lambda$ to $100\lambda$.

7. The backlight module of claim 1, wherein the wire grate is a diffraction wire grate.

8. The backlight module of claim 1, wherein each prism group comprises a plurality of prisms, each prism extends in the second direction, and the plurality of prisms comprised in one same prism group are arranged in the first direction.

9. The backlight module of claim 8, wherein each prism is a triangular prism, each prism has an apex angle, and the apex angle is located on a side of the prism away from the second surface; and
- wherein in one same prism group, apex angles of at least some of the plurality of prisms are different from each other.

10. The backlight module of claim 9, wherein each prism group has a symmetry plane, the symmetry plane is perpendicular to the second surface and extends in the second direction, and each prism group has a plane-symmetric structure that is symmetric with respect to the symmetry plane; and
- wherein a spacing distance in the first direction between an orthographic projection of the symmetry plane on the first surface and one of two adjacent wire grates, is equal to a spacing distance in the first direction between the orthographic projection of the symmetry plane on the first surface and the other of the two adjacent wire grates.

11. The backlight module of claim 10, wherein in one same prism group, the apex angles of the plurality of prisms on one side of the symmetry plane gradually decrease in a direction from a prism farthest from the symmetry plane to the symmetry plane.

12. The backlight module of claim 11, wherein the apex angles of the plurality of prisms on the one side of the symmetry plane gradually decrease with a fixed difference.

13. The backlight module of claim 11, wherein the apex angles of the plurality of prisms in each prism group are in a range of 40° to 80°.

14. The backlight module of claim 4, wherein the brightness enhancement structure comprises a first prism group and a second prism group, the first prism group is arranged on one of the first surface of the third substrate and the second surface of the third base, and the second prism group is arranged on a side of the first prism group away from the third base; and
- wherein the first prism group comprises a plurality of first prisms, the second prism group comprises a plurality of second prisms, each first prism extends in the second direction, each second prism extends in the first direction, the plurality of first prisms in the first prism group are arranged in the first direction, and the plurality of second prisms in the second prism group are arranged in the second direction.

15. The backlight module of claim 14, wherein the third substrate further comprises a planarization layer between a layer where the first prism group is located and a layer where the second prism group is located, a material of the planarization layer comprises an optical glue, and a refractive index of the optical glue is smaller than a refractive index of a material of each of the first prisms and the second prisms.

16. A display device, wherein the display device comprises the backlight module according to claim 1.

17. A method of manufacturing a backlight module, comprising:
- forming a mini light-emitting diode chip array and an encapsulation layer covering the mini light-emitting diode chip array on a first base, wherein the mini light-emitting diode chip array comprises a plurality of mini light-emitting diode chips;
- forming, by a nano imprinting process, a superlens array on a surface of the encapsulation layer away from the first base, wherein the superlens array comprises a plurality of superlenses;
- forming a wire grate array on a first surface of a glass base, wherein the wire grate array comprises a plurality of wire grates;
- forming a prism structure on a second surface of the glass base, wherein the prism structure comprises a plurality of prism groups, and the first surface and the second surface are two opposite surfaces of the glass base, respectively; and
- assembling the first base and the glass base,
- wherein orthographic projections of the plurality of superlenses on the first base at least partially overlap with orthographic projections of the plurality of mini light-emitting diode chips on the first base, respectively, orthographic projections of the plurality of wire grates on the first base at least partially overlap with the orthographic projections of the plurality of superlenses on the first base, respectively, and orthographic projections of the plurality of prism groups on the first base are located between the orthographic projections of two adjacent wire grates on the first base, respectively.

\* \* \* \* \*